(12) United States Patent
Dulley et al.

(10) Patent No.: US 10,365,421 B2
(45) Date of Patent: Jul. 30, 2019

(54) LIGHTING DEVICE WITH LIGHT PIPE ENCLOSED WITHIN A BULB AND HAVING COLORED LINES

(71) Applicant: Buster and Punch Limited, London (GB)

(72) Inventors: Iain Dulley, London (GB); Massimo Minale, London (GB)

(73) Assignee: BUSTER AND PUNCH LIMITED, London (GB)

( * ) Notice: Subject to any disclaimer, the term of this patent is extended or adjusted under 35 U.S.C. 154(b) by 202 days.

(21) Appl. No.: 14/930,329

(22) Filed: Nov. 2, 2015

(65) Prior Publication Data

US 2016/0258579 A1    Sep. 8, 2016

(30) Foreign Application Priority Data

Mar. 2, 2015  (GB) .................. 1503487.9
Oct. 12, 2015 (GB) .................. 1518036.7

(51) Int. Cl.
| | |
|---|---|
| *F21V 8/00* | (2006.01) |
| *F21K 9/232* | (2016.01) |
| *F21K 9/61* | (2016.01) |
| *F21Y 115/10* | (2016.01) |

(52) U.S. Cl.
CPC ......... *G02B 6/0003* (2013.01); *F21K 9/232* (2016.08); *F21K 9/61* (2016.08); *G02B 6/001* (2013.01); *G02B 6/0006* (2013.01); *G02B 6/0008* (2013.01); *F21Y 2115/10* (2016.08); *Y02B 20/386* (2013.01)

(58) Field of Classification Search
CPC ............ F21V 2200/15; F21V 2200/30; F21V 2200/40; F21V 3/02; F21V 19/006; F21V 19/007
See application file for complete search history.

(56) References Cited

U.S. PATENT DOCUMENTS

| | | | | |
|---|---|---|---|---|
| 2,362,131 A | * | 11/1944 | Haggart, Jr. ............. | G08G 1/09 340/321 |
| 4,208,701 A | * | 6/1980 | Schock ................ | A63H 33/009 362/102 |
| 4,422,719 A | * | 12/1983 | Orcutt ............... | B29D 11/00711 362/562 |
| 4,600,974 A | * | 7/1986 | Lew ......................... | F21L 4/00 362/102 |

(Continued)

FOREIGN PATENT DOCUMENTS

| | | |
|---|---|---|
| CN | 2519104 Y | 10/2002 |
| CN | 2536894 Y | 2/2003 |

(Continued)

OTHER PUBLICATIONS

Search Report dated Apr. 20, 2016 in corresponding GB Application No. 1518036.7.

*Primary Examiner* — Ismael Negron
(74) *Attorney, Agent, or Firm* — Muncy, Geissler, Olds & Lowe, P.C.

(57) ABSTRACT

A lighting device includes a bar or tube shaped light pipe, having colored lines extending along and within it, and a light source coupled to the light pipe such that, when the light source is energized, the light pipe projects at least a first portion of the light out a side surface.

22 Claims, 9 Drawing Sheets

(56) References Cited

U.S. PATENT DOCUMENTS

| | | | | |
|---|---|---|---|---|
| 5,105,309 A | * | 4/1992 | Baravaglio | G08B 5/006 359/515 |
| 5,165,781 A | * | 11/1992 | Orak | A63H 33/22 362/101 |
| 5,980,063 A | * | 11/1999 | Ford | F21L 4/00 359/709 |
| 6,550,952 B1 | | 4/2003 | Hulse et al. | |
| 6,758,588 B2 | * | 7/2004 | Hsu | B60Q 1/56 362/158 |
| 7,565,050 B2 | * | 7/2009 | Lee | G02B 6/0096 362/551 |
| 7,699,490 B2 | * | 4/2010 | Tsai | F21S 6/004 362/101 |
| 7,726,860 B2 | * | 6/2010 | Harrity | F21S 6/001 362/555 |
| 7,837,348 B2 | * | 11/2010 | Narendran | F21K 9/00 362/231 |
| 7,976,206 B2 | * | 7/2011 | Wu | F21V 3/02 313/315 |
| 8,136,959 B2 | * | 3/2012 | Ho | F21S 4/00 362/223 |
| 8,287,145 B2 | * | 10/2012 | Isogai | F21V 3/02 362/221 |
| 9,447,945 B2 | * | 9/2016 | Narendran | F21K 9/00 |
| 2006/0061990 A1 | | 3/2006 | Chinniah et al. | |
| 2011/0309735 A1 | | 12/2011 | Parker et al. | |
| 2013/0107516 A1 | * | 5/2013 | Chou | F21K 9/232 362/235 |
| 2013/0279149 A1 | * | 10/2013 | Udatsu | F21V 7/0091 362/84 |
| 2014/0146558 A1 | | 5/2014 | Chen | |
| 2014/0376217 A1 | | 12/2014 | Yamada et al. | |
| 2015/0029742 A1 | * | 1/2015 | Chen | F21K 9/52 362/555 |

FOREIGN PATENT DOCUMENTS

| | | |
|---|---|---|
| CN | 1802533 A | 7/2006 |
| CN | 201973466 U | 9/2011 |
| CN | 102679209 A | 9/2012 |
| CN | 202484668 U | 10/2012 |
| CN | 104067045 A | 9/2014 |
| CN | 104295945 A | 1/2015 |
| CN | 105190169 A | 12/2015 |
| JP | 2015195156 A | 11/2015 |
| TW | 201231879 A | 8/2012 |
| WO | WO 2014/180689 A1 | 11/2014 |
| WO | WO 2014/196498 A1 | 12/2014 |

* cited by examiner

LIGHTING DEVICE WITH LIGHT PIPE ENCLOSED WITHIN A BULB AND HAVING COLORED LINES

FIELD OF THE INVENTION

This invention relates to a light bulb.

BACKGROUND TO THE INVENTION

The need to reduce energy consumption is a universal consideration when supplying electrical goods to consumers. Due to their prevalence throughout society, light bulbs account for a large percentage of today's energy usage and thus much effort has been focused on the development of energy efficient lightbulbs. However, current energy efficient bulbs are not a complete solution to the replacement of the traditional filament or incandescent light bulb.

Fluorescent 'energy saving' bulbs are commonly used to replace traditional filament style bulbs, although this is frequently with complaint. Commonly cited problems include a lengthy period after such a bulb is turned on before it reaches its full brightness, and a general dimness of the bulbs compared to their filament based predecessors. Other alternatives include halogen lights and light emitting diodes (LEDs). Whilst these sources of light may easily be as bright as, or surpass the brightness of, traditional filament bulbs, consumers frequently make complaints centred on the colour temperature of the light produced, or the focused nature of the light produced by fittings containing these light sources.

In addition, many types of halogen or LED bulb cannot be retrofitted into existing lighting fixtures. In this case, any relighting of a space using energy efficient means may require and expensive installation of an entirely new lighting system. Moreover, historically fluorescent 'energy saving' and LED light bulbs have been designed in ways that are aesthetically unsatisfactory.

It is also the case that current lighting technologies offer light bulbs that provide either ambient light or light that is focused on to a single spot or localised area. In some situations, the use of both a focused and ambient light is desired. Currently, such lighting solutions are provided via the use of multiple bulbs, some providing the ambient lighting with others providing a more focused source of light. In this case, energy consumption could be further reduced, and convenience to an end user increased, if both sources of light were provided from a single bulb.

As such, it is desirable to provide a light bulb that provides both the brightness and warm colour temperature of traditional filament bulbs with the energy efficiency and long bulb life of modern lighting solutions. Any new design should also offer aesthetic advantages over LED and 'energy saving' fluorescent bulbs and, preferably, provide a source of both ambient and more focused light. Furthermore, any new light bulb should preferably be backwards compatible with lighting fixtures typically found in both home and commercial settings; for example, including options for use in both screw and bayonet fittings.

SUMMARY OF THE INVENTION

According to the present invention there is provided a light bulb comprising:
 a light source; and
 a light pipe mounted to the light source; wherein
 the light pipe is a transparent bar or tube having coloured lines extending along and within it.

When illuminated by the light source, a light pipe of this construction acts as a means for dissipating light, providing the desirable effect of a traditional filament or incandescent bulb without the high temperatures and low energy efficiency associated with such a light source. It is also the case that the flexibility in design of such a solution offers the ability for the light bulb to come in many different forms, providing a variation in design which allows the light bulb's aesthetics to be tailored to a wide range of end user preferences. Such a light bulb may also include a screw or bayonet fitting, amongst others, allowing it to be retrofitted into existing lighting units providing backwards compatibility with existing lighting installations.

Furthermore, the length of the light pipe may be used to carry light into an otherwise difficult to illuminate, long, thin bulb with a single point light source. Light from the source may be refracted or reflected within, along and through the light pipe, resulting in the propagation of light along the pipe itself and a diffuse spread of light exiting the light pipe along its entire length.

Also according to the present invention, there is provided a light bulb, comprising:
 a light source; and
 a light pipe mounted to the light source; wherein
 the light pipe is a translucent bar or translucent tube.

The use of a translucent light pipe may be preferred as, in such an embodiment, the light bulb may only create an area of focused light without any associated ambient light. Such an embodiment may be advantageous in situations where a focused area of light is desired distant from any light source, and ambient light between the light source and the focused area of light is undesirable, such as in hybrid solar lighting systems It is also preferable that the light bulb provides an area of ambient light and an area of focused light. This can be achieved by the light pipe, which can convey some of the light along it, while allowing some to escape through the sides. Such a lighting system allows a single light bulb to be used in situations where both ambient and focused light are desired by an end user, potentially reducing energy consumption over pre-existing lighting solutions where at least two bulbs would be required. Furthermore, the use of only a single bulb may offer far greater convenience to the end user and a potential reduction in lighting fixture size, due to the reduction in bulb number, allowing a greater degree of aesthetic consideration in the design of said fixtures.

The light source may be an LED. The use of an LED light source is preferable as LEDs are highly energy efficient sources of light, typically operating at temperatures lower that traditional filament and incandescent bulbs. During operation, LED lights may produce the same light output as a traditional filament or incandescent bulb whilst consuming only 5% of the energy, over a lifespan that is typically seven times longer for the LED. Furthermore, it is possible to power an LED bulb from an existing lighting circuit, enhancing the ability to retrofit light bulbs using LEDs as a light source. In addition, the colour of the LED can be finely tuned, resulting in a light temperature that can be tailored to the application of the bulb or is aesthetically pleasing and acceptable to the consumer.

The light pipe may be enclosed within a glass bulb. The enclosure of the light pipe within the glass bulb protects it from the accumulation of dust and other debris.

It may also be preferable for the coloured lines to extend along the inner surface of the tube. The presence of coloured lines along the inner surface of the tube may assist a desired propagation of light along the light pipe, increasing its functionality, for example by channelling or diffracting light in a desired fashion, and providing different aesthetic effects.

Furthermore, it may be preferable for the shape of the light pipe to magnify coloured lines which extend along the inner surface of the tube when they are viewed from the outside. Such an embodiment may again assist the light pipe in achieving the desired distribution of light from the light source by reflection and refraction.

In another embodiment, the coloured lines may be enclosed substantially within the bar or tube that forms the light pipe. Again, an embodiment of this form may assist the light pipe in achieving the desired distribution of light from the light source by reflection and refraction.

In one embodiment, the light pipe may have a substantially annular cross section. In another embodiment, the light pipe may have a substantially rectangular cross section. In an additional embodiment, the light pipe may have a triangular cross section. In one further embodiment, the light pipe may have a substantially circular cross section. Another embodiment of the light bulb includes a light pipe with a cross section that is substantially uniform along a lengthwise axis of the light pipe. Which of these embodiments is preferred may depend on the desired distribution of light from the light source, via the light pipe by reflection and refraction, or the application of the light bulb.

In another preferred embodiment of the invention, the coloured lines extend substantially parallel to a lengthwise axis of the light pipe. In a further preferred embodiment of the invention the coloured lines may extend helically along the lengthwise axis of the light pipe, the centre of rotation of the helix lying on an axis substantially parallel to the lengthwise axis of the light pipe. Again, which of these embodiments is preferred may depend on the desired distribution of light from the light source, via the light pipe, by reflection and refraction.

It may also be preferred for the light pipe to be coloured or tinted. Colouring or tinting the light pipe may allow the colour temperature of the light source to be controlled, increasing the range of lighting that can be achieved with the invention and tailoring the light produced by the bulb to its application or for aesthetics.

Preferably the light pipe may be translucent. The use of a translucent light pipe may be preferable as such a light pipe may allow the amount of light dissipated as ambient light through the sides of the light pipe to be controlled. Such control may be obtained with the variation of the amount of light which may pass through the translucent light pipe. It may be preferable for the degree of translucence to be varied either between individual pipes or along the length of a single pipe.

It may be preferable to tint or colour a glass bulb that is used in the light bulb. Such a tinting or colouring may be used in conjunction with, or instead of, a tinting or colouring of the light pipe to tailor the colour of the light produced by the light bulb to its application or for aesthetics. In addition, colouring or tinting the glass bulb and/or the light pipe may be used in conjunction with adjusting the colour of the light produced by the light source to achieve a fine layer of control over the light spectrum produced by the light bulb.

In some embodiments, a light source may be provided only at one end of the light pipe. Alternatively, in some cases it may be preferable to provide a light source at both ends of the light pipe. Such an embodiment may be preferable as it may provide a light with greater power, or enable the retrofitting of the light bulb into additional pre-existing lighting fixtures.

In a further embodiment, a light source is provided substantially along the centre of the light pipe. This may be preferable as it may provide a more even spread of light from the light bulb if the light pipe has an extended length.

In another preferred embodiment the coloured lines may include a photo luminescent material. The inclusion of a photo luminescent material in the coloured lines may be preferred as it provides an additional means of manipulating the light output of the light bulb, including the production of light when the bulb is off.

Furthermore, it may be preferable for the coloured lines to include a photo reflective material. The inclusion of a photo reflective material may be preferred as it provides an additional means of manipulating the light produced by the light source and thus the output of the light bulb. The use of a reflective material in coloured lines extending along the longitudinal axis of the light pipe may be used to reflect additional light along the length of the light pipe, potentially preferable where the light pipe has an extended length.

The light pipe may be an extruded transparent bar or tube, and the lines may be co-extruded with and into the bar or tube. This technique permits great flexibility in how and where the lines can be embedded within the light pipe, making a wide variety of visual lighting effects possible.

Preferably, the light pipe may further comprise at least one groove. Such a feature may be preferable as it may allow further customisation of the visual effect obtained by the lightbulb. Preferably said groove may extend along the length of the light pipe. Preferably said groove may be generally parallel with the longitudinal axis of the light pipe.

According to a further aspect of the invention, there is provided a method for manufacture, comprising:
  extruding a light pipe,
  the light pipe being extruded with a coloured material extending along and within it, and
  mounting the light pipe to a light source.

Such a method of extrusion may be preferred as it provides a well characterised method for the production of shapes such as those required in the embodiments of the light pipe and is suitable for both batch and mass production of the light pipe.

DETAILED DESCRIPTION

The invention will now be described by way of example with reference to the following figures in which:
  FIG. 1 is a schematic view of a light bulb;
  FIG. 2 is a schematic view of a cross section of a light bulb;
  FIG. 3 is a schematic of a process of extruding the light pipe;
  FIG. 4 is a schematic focusing on the inclusion of the coloured lines in the extruded light pipe;
  FIG. 5 is a schematic view of a light bulb with a triangular cross section;
  FIG. 6 is a schematic view of a light bulb with a rectangular cross section;
  FIG. 7 is a schematic view of a light bulb where the coloured lines extend helically within the light pipe;
  FIG. 8 is a schematic view of four different embodiments of a glass bulb that may be added to the light bulb; and
  FIG. 9 is a schematic view of a light bulb with a translucent or frosted light pipe.

Referring to the drawings in detail, FIG. 1 depicts an embodiment of the light bulb wherein a light pipe 1 with a circular cross section is mounted at its proximal end on a light source (not seen) with a fixing element 2. The light pipe 1 contains coloured lines 3 that extend substantially along the inner surface of the light pipe, although it will be appreciated by the skilled person that these lines may extend substantially along the outer surface of the light pipe, substantially within the material that forms a main body of the light pipe or any combination of the three. In this embodiment of the light bulb, a glass bulb 4 encloses the light pipe and is attached to the bulb with an outer ring 5. However, the light bulb may in fact be provided without a bulb. In the present specification the term "light bulb" is used to describe the device, irrespective of whether a glass bulb is in fact included. Both the glass bulb 4 and the light pipe 1 are connected to the light fitting 6. In this embodiment the light fitting 6 is depicted as a screw fitting, although the use of a bayonet fitting is envisaged as an alternative.

FIG. 2 is a cross section of the bulb schematically illustrated in FIG. 1. Here, the affixation of the proximal end of the light pipe 1 to a light source 7 can be seen in more detail. In this embodiment, the light source 7 is an LED bulb, though other solutions such as halogen bulbs are envisaged. It is also envisaged that a light source may be present at both the proximal and distal ends of the light pipe or, alternatively, substantially along the centre line of the light pipe (which may be hollow).

The light pipe 1 is typically, but not exclusively, a thermosetting plastic and is held in place with respect to the light source 7 by the fixing element 2. It is envisaged that the plastic forming the main body of the light pipe will be substantially clear, although tinted and coloured materials may also be used. The fixing element 2 is also typically a plastic, although aluminium or alloy alternatives are also envisaged. As depicted in FIG. 2, the fixing element 2 may grip the light pipe 1 on the outer surface of its proximal end via a series of teeth 8 that interlock with corresponding features on the surface of the light pipe 1. Alternatively, glue, screws, a screw thread or any other appropriate mechanical means may be used to affix the proximal end of the light pipe 1 to the fixing element 2 and thus the light source 7.

For effective operation, in this embodiment, the LED light source 7 is connected to both a heat sink 9 and driver unit 10. The inclusion of the heat sink 9 allows the light source 7 to be powered by the driver unit 10 without an excessive increase in the temperature of the light bulb and a concomitant decrease in efficiency. In this embodiment, the light pipe 1, fixing element 2, light source 7, heat sink 9 and driver unit 10 are all contained within the glass bulb 4 and light fitting 6. The light fitting 6 and glass bulb 4 may be held in place, and the other components of the light held within them, using an outer ring 5. It is envisaged that this outer ring 5 will be typically made from aluminium, though other metals, alloys and plastics are not excluded.

FIG. 2 also depicts the both the focused 39 and ambient 40 light that may be produced by the light bulb. In use, some of the light produced by the LED light source 7 passes either directly down the light pipe 1 and out of the distal end, or is partially reflected by the internal walls of the light pipe 1, travelling along the light pipe 1 before exiting at its distal end, forming a focused area (spot) of light 39. Additionally, some of the light from the LED light source 7 exits the light pipe 1 from various points along its length (in generally random directions), providing a source of diffuse light 40 in combination with the focused light 39 source.

FIG. 3 is a schematic depiction of the extrusion of the light pipe 1. To produce the light pipe 1 as depicted in FIGS. 1 and 2, clear plastic granules are loaded into a first hopper 11 and transported along a first pipe 12 by a first screw drive 13. The first screw drive 13 is driven by a first motor 14, transporting the clear plastic granules along the first pipe 12 at a speed controlled by the first speed controller 15.

Coloured plastic granules are loaded into a second hopper 16 and transported along a second pipe 17 by a second screw drive 18. Typically, the material loaded into the second hopper 16 will be plastic alone, although the inclusion of photo-luminescent or photo-reflective materials will be preferable in some embodiments. The second screw drive 18 is driven by a second motor 19, transporting the coloured plastic granules along the second pipe 17 at a speed controlled by the second speed controller 20.

During the transportation of the clear and coloured plastic granules along the first and second pipes 12, 17 by the first and second screw drives 13, 18 respectively, the granules are heated until they become a fluid by first and second heating units 21, 22. The temperature of both heating units 21, 22 is controlled independently. A first temperature controlling unit 23 controls the temperature of the first heating unit 21 and a second temperature controller 24 controls the temperature of the second heating unit 22. The temperature of the heating units 21, 22 is such that both the clear and coloured plastics are fluid enough for extrusion when they are located at the plastic intersection 25.

The plastic intersection extrudes the clear and coloured plastics into the form of an extrudate 26. An extrudate 26 with approximately the same cross section as the light pipe 1 exits the plastic intersection 25 via the aperture 27 into a water bath 28. The water bath 28 cools the extrudate 26 such that it becomes entirely solid. The solid extrudate 26 is pulled though the water bath 28 by a track system 29, before the solid extrudate 26 is cut into sections suitable for use as the light pipe 1 by a cutting tool 30.

FIG. 4 is a schematic diagram of the extrusion process inside the plastic intersection. Clear plastic 31 is pushed in an outer central cavity 32 of the plastic intersection 25 by the first screw drive 13, the clear plastic 31 flowing in an annular shape due to the confinement of an outer mould 33 and first 34 and second 35 central tools. Coloured plastic 36 is pushed into an inner central cavity 37, located within the first and second central tools 34, 35, by the second screw drive 18. The location of the exit of the coloured plastic 36 from the inner central cavity 37 is controlled by the third central tool 38. Different embodiments of the third central tool 38 can be used to achieve different distributions of the coloured plastic 26 in the extrudate 26 and thus the final light pipe 1.

Figure 7:
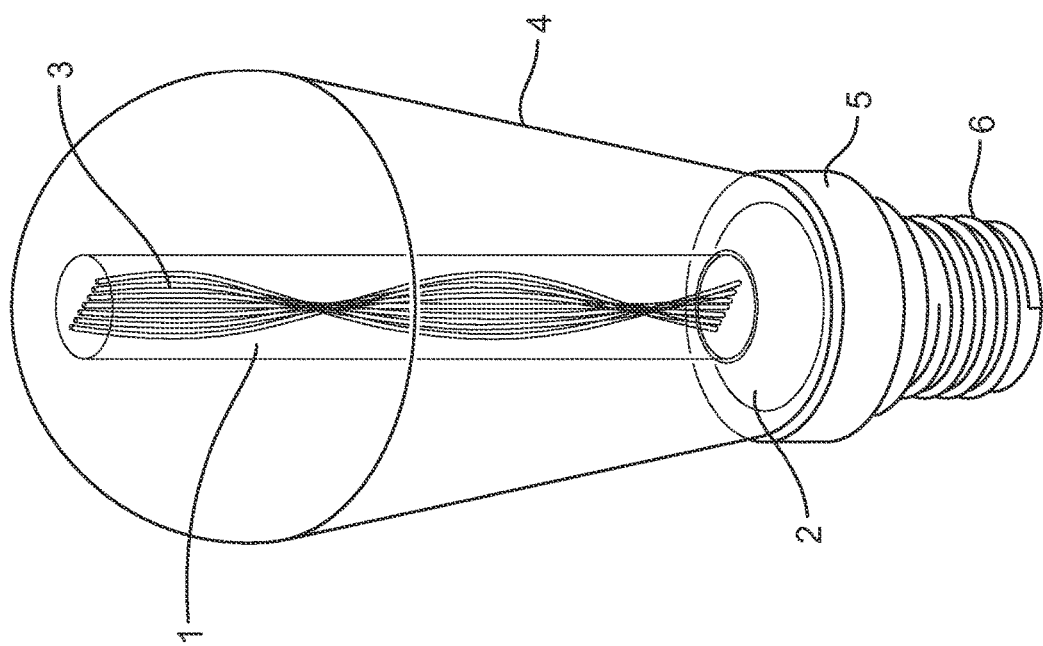

FIG. 7 is a schematic diagram of an embodiment of a light bulb wherein the light pipe 1 has a circular cross section. In this embodiment, the coloured lines 3 lie within the main body of the light pipe 1 and extend helically along the lengthwise axis of the light pipe 1.

Figure 1:
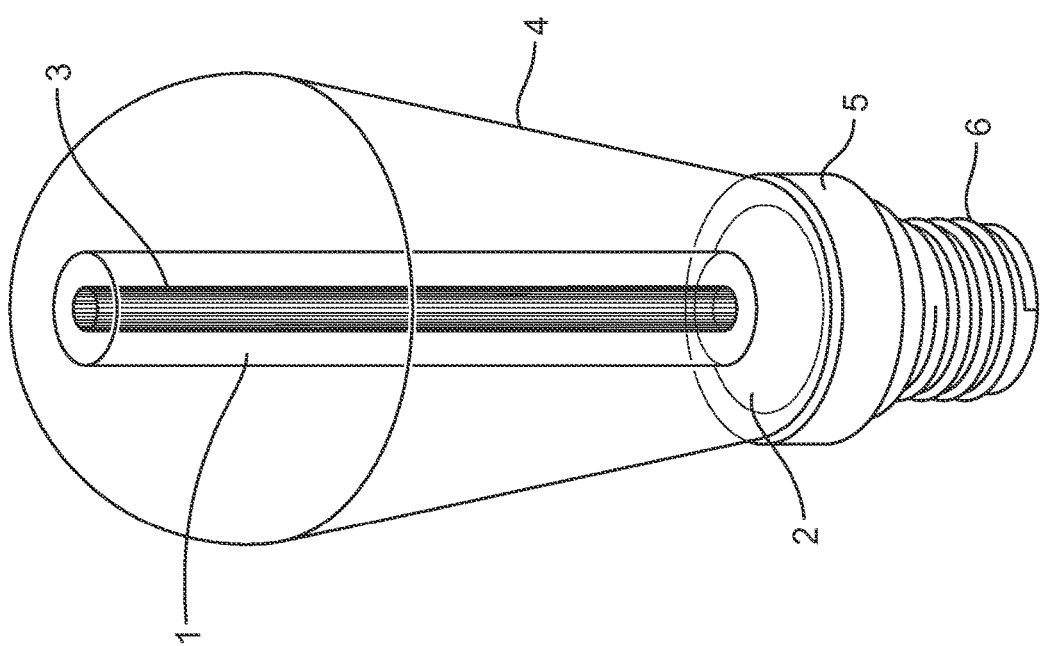
Figure 2:
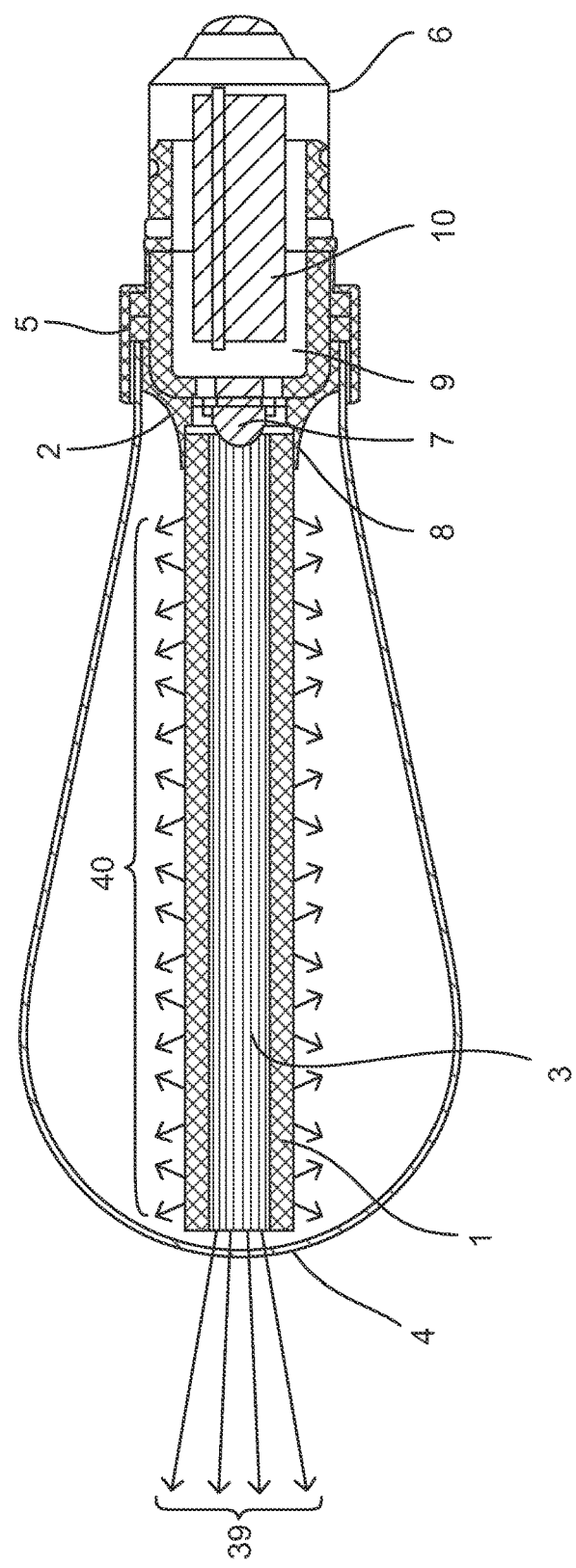
Figure 3:
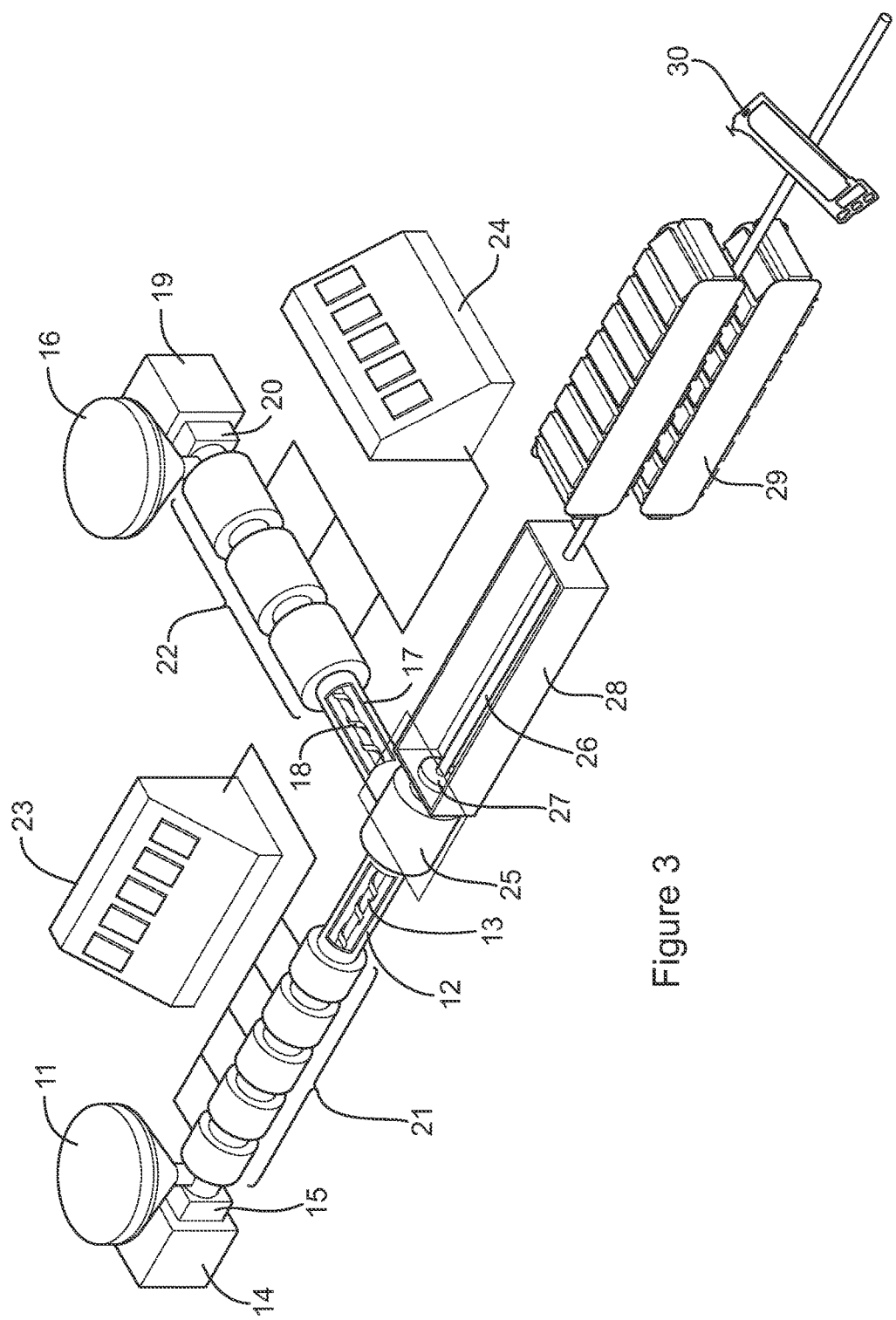
Figure 4:
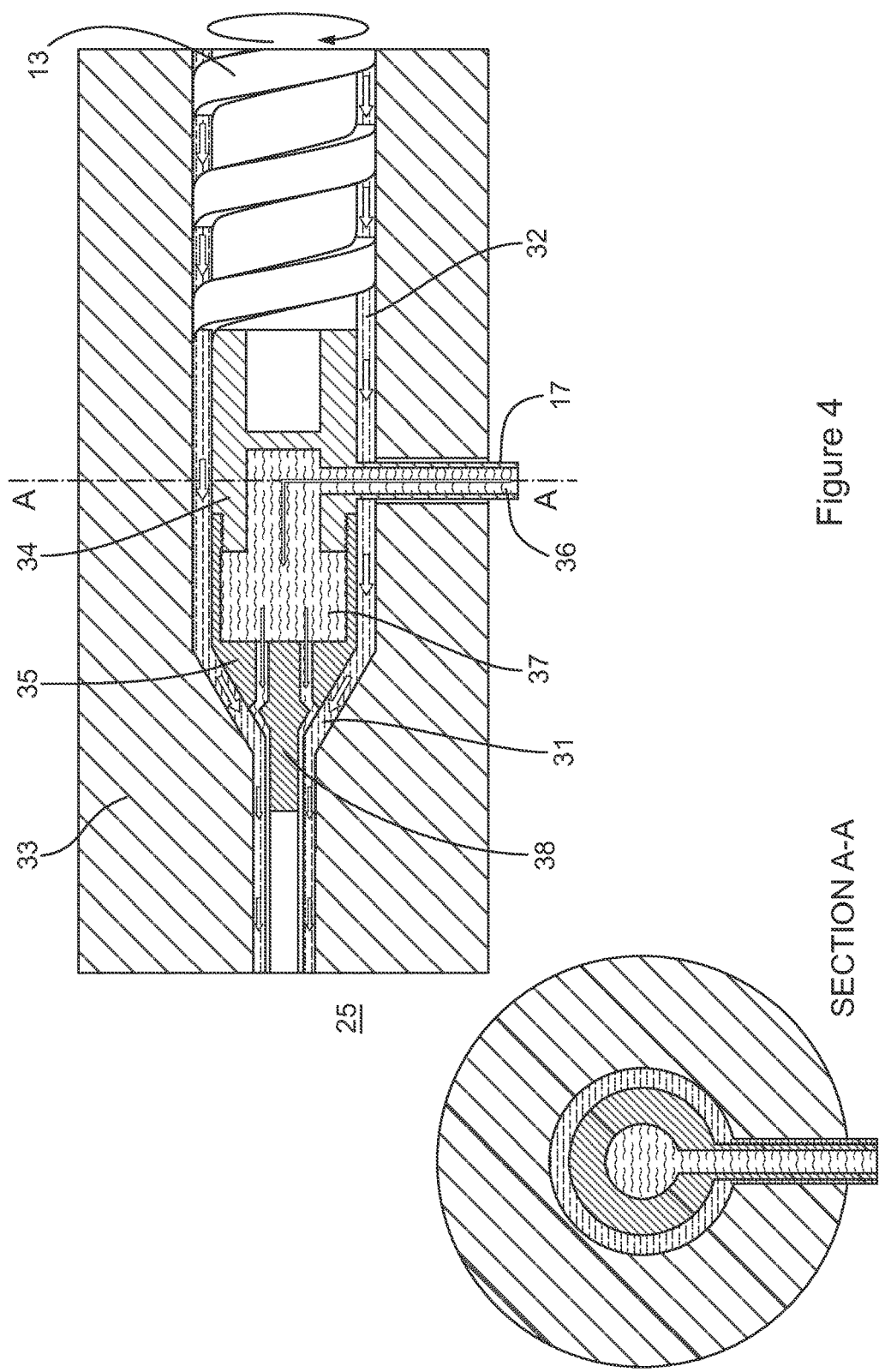
Figure 5:
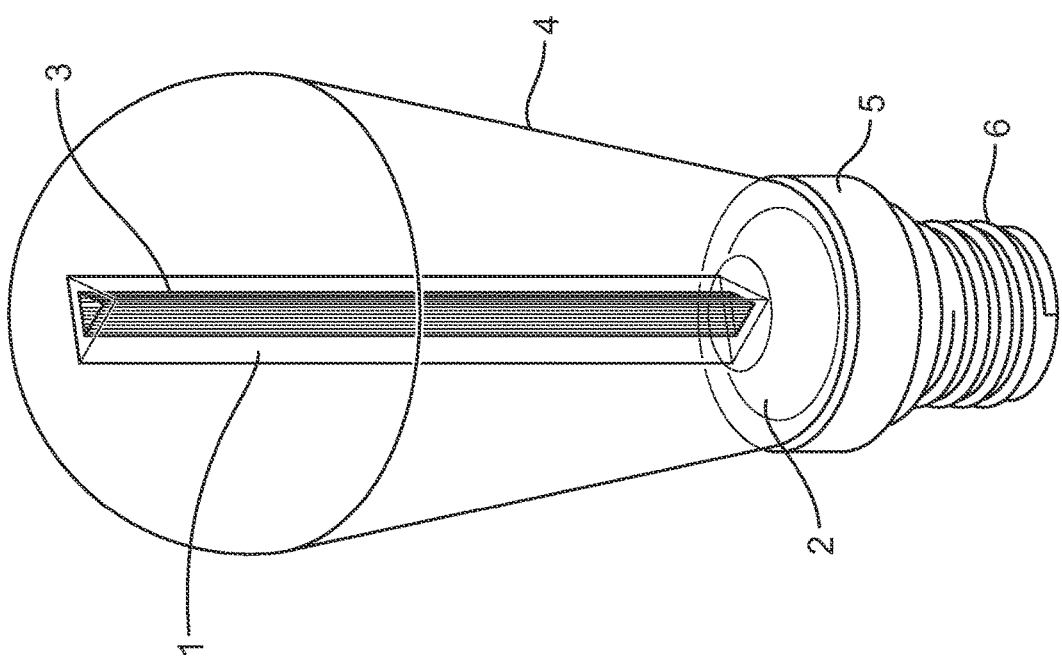
FIG. 5 is a schematic diagram of an embodiment of a light bulb wherein the light pipe 1 has a triangular cross section.
Figure 6:
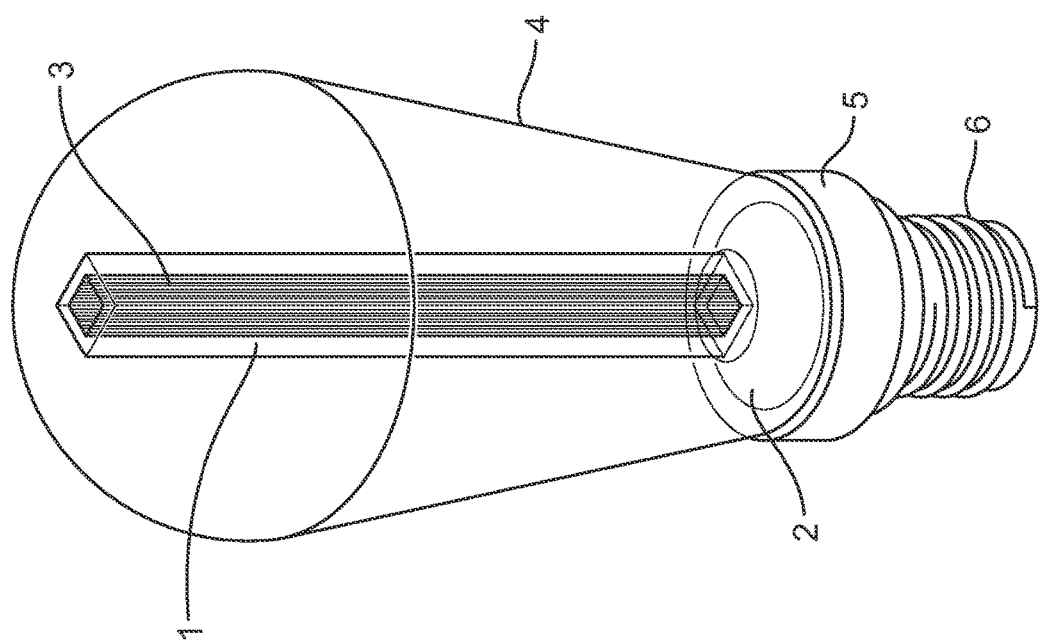
FIG. 6 is a schematic diagram of an embodiment of a light bulb wherein the light pipe 1 has a rectangular cross section.

The formation of a light pipe with a triangular, rectangular or circular cross section is possible using the extrusion method detailed in FIGS. 3 and 4. For each extrusion shape, appropriate selections of the outer mould 33 and first 34 second 35 and third 38 central tools must be made to ensure the correct extrudate 26 shape and coloured line 3 location as the extrudate 26 enters the water bath 28 through the aperture 27. In order to achieve the helical lines of FIG. 7, the third 38 central tool may be required to rotate with respect to the second 35 tool.

Figure 8:
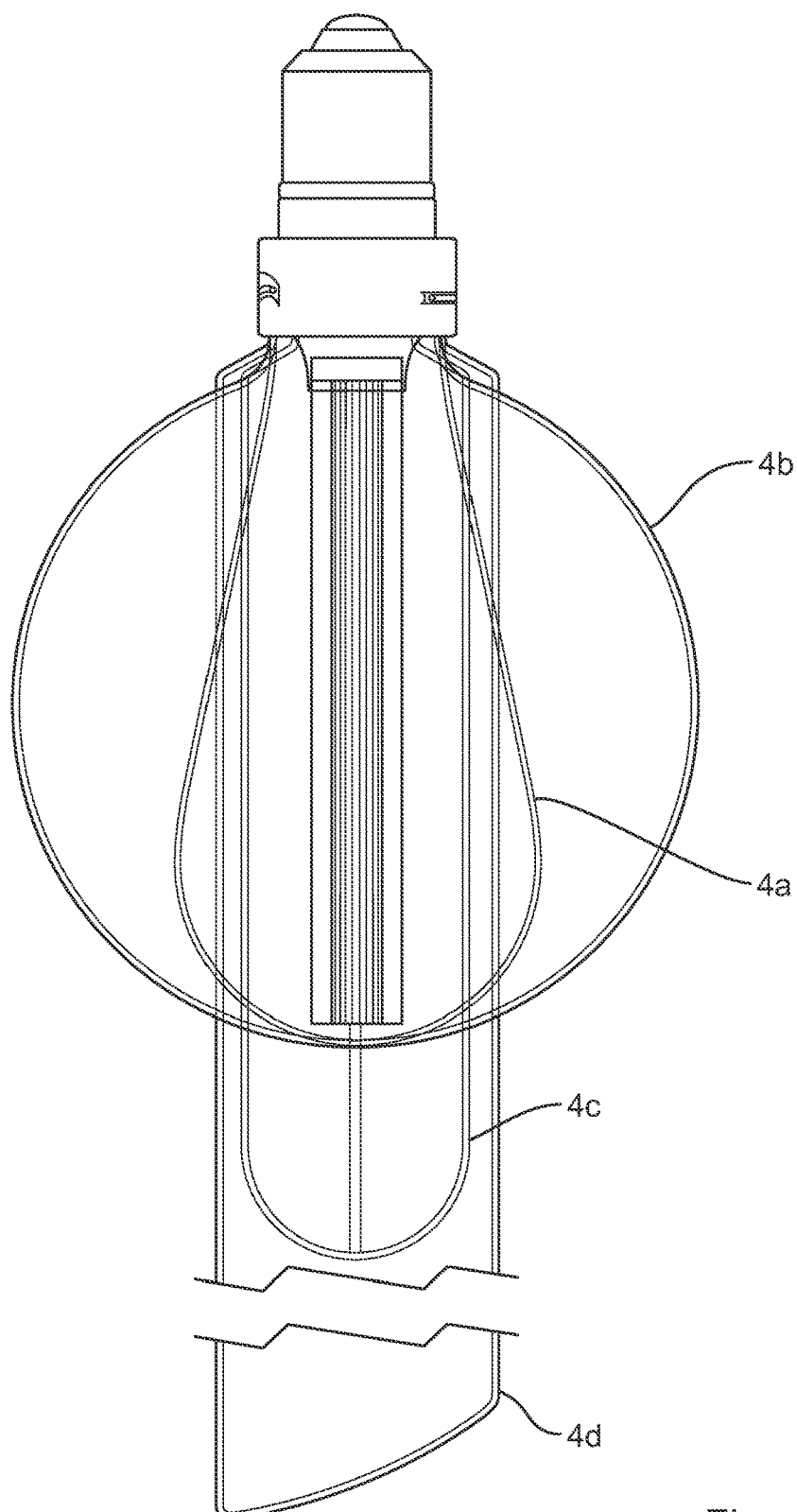

FIG. 8 is a schematic diagram of four different embodiments of a glass bulb 4 that may be used, but are not essentially used, with the light bulb. Four embodiments of bulb shape that may be used with the light bulb are a teardrop bulb 4a, a globe bulb 4b, a tubular bulb 4c and a chamfer end bulb 4d, although a person skilled in the art will appreciate these possibilities are not exhaustive. Typically, it will be preferable for the glass bulb 4 to be clear, although the use of coloured, tinted, frosted or mirrored glass remains a possibility.

Figure 9:
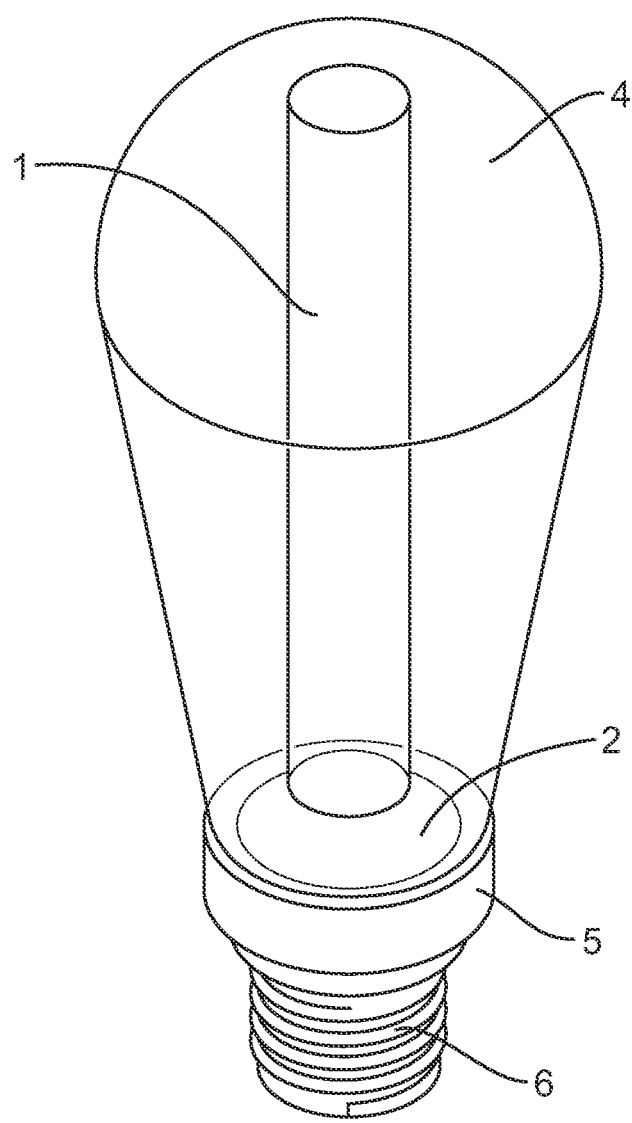

FIG. 9 is a schematic diagram of a light bulb wherein the light pipe 1 is translucent or frosted. In this case, the translucent or frosted light pipe 1 allows the passage of light through the pipe and the production of a diffuse light from the light bulb. Such a translucent or frosted light pipe may be formed via the use of a suitable translucent or frosted plastic in the extrusion process, or with the alteration of the light pipe after the extrusion process with paint, abrasion, sputtering or other surface treatments. The light pipe may comprise an etched surface which is not transparent. Finally, a chemical treatments such as etching may be used in the creation of a translucent or frosted light pipe.

While embodiments of the present invention have been described using the preferred example of an extruded bar or tube to form the light pipe, the skilled person will appreciate that much of the benefit can be achieved using other manufacturing techniques, such as injection moulding.

The invention claimed is:

1. A light bulb, comprising:
   a light source;
   a bulb; and
   a light pipe mounted to the light source and enclosed within the bulb, the light pipe having a lengthwise axis;
   wherein the light pipe is a transparent bar or tube having coloured lines extending along and within it,
   wherein the coloured lines are at least partially embedded in the light pipe, and
   wherein each of said coloured lines extends longitudinally substantially parallel to the lengthwise axis of the light pipe.

2. The light bulb as claimed in claim 1, wherein the light source is an LED.

3. The light bulb as claimed in claim 1, wherein the coloured lines are enclosed substantially within the bar or tube that forms the light pipe.

4. The light bulb as claimed in claim 1, wherein the light pipe has a substantially annular cross section.

5. The light bulb as claimed in claim 1, wherein the light pipe has a substantially rectangular cross section.

6. The light bulb as claimed in claim 1, wherein the light pipe has a substantially triangular cross section.

7. The light bulb as claimed in claim 1, wherein the light pipe has a substantially circular cross section.

8. The light bulb as claimed in claim 1, wherein the light pipe has cross section that is substantially uniform along a lengthwise axis of the light pipe.

9. The light bulb as claimed in claim 1, wherein the light pipe is coloured or tinted.

10. The light pipe as claimed in claim 1, wherein the light pipe is translucent.

11. The light bulb as claimed in claim 1, wherein a light source is provided only at one end of the light pipe.

12. The light bulb as claimed in claim 1, wherein a light source is provided substantially along the centre of the light pipe.

13. The light bulb as claimed in claim 1, wherein the coloured lines include a photo-luminescent material.

14. The light bulb as claimed in claim 1, wherein the coloured lines include a photo-reflective material.

15. The light bulb as claimed in claim 1, wherein the coloured lines are formed integrally with the light pipe and co-extruded with the light pipe.

16. A light bulb as claimed in claim 1, wherein a portion of the light from the light source is conveyed along the light pipe and out its distal end, while a portion of the light from the light source escapes through the sides of the light pipe.

17. The light bulb as claimed in claim 16, wherein the light exiting from the distal end of the light pipe forms a focused spot while the light escaping through the sides of the light pipe provides diffuse illumination.

18. The light bulb, as claimed in claim 1, wherein the bulb is a glass bulb.

19. The light bulb as claimed in claim 18, wherein the glass bulb is coloured or tinted.

20. The light bulb as claimed in claim 1, wherein the light pipe is a tube and the coloured lines extend along the inner surface of the tube.

21. The light bulb as claimed in claim 20, wherein the shape of the light pipe magnifies the coloured lines which extend along the inner surface of the light pipe when viewed from the outside.

22. A method of manufacture, comprising:
   extruding a light pipe having a lengthwise axis, the light pipe being extruded with a coloured material to form a light pipe which is a transparent bar or tube having coloured lines extending along and within it, wherein the coloured lines are at least partially embedded in the light pipe and wherein each of said coloured lines extends longitudinally substantially parallel to the lengthwise axis of the light pipe; and
   mounting the light pipe to a light source and enclosing the light pipe within a bulb.

* * * * *